(12) United States Patent
Stieff

(10) Patent No.: US 9,395,179 B2
(45) Date of Patent: Jul. 19, 2016

(54) METHOD FOR DETECTING SENSOR OR TARGET SLIP DURING VEHICLE ALIGNMENT MEASUREMENT

(71) Applicant: Hunter Engineering Company, St. Louis, MO (US)

(72) Inventor: Michael T. Stieff, Wentzville, MO (US)

(73) Assignee: Hunter Engineering Company, St. Louis, MO (US)

( * ) Notice: Subject to any disclaimer, the term of this patent is extended or adjusted under 35 U.S.C. 154(b) by 77 days.

(21) Appl. No.: 14/548,005

(22) Filed: Nov. 19, 2014

(65) Prior Publication Data

US 2015/0176986 A1 Jun. 25, 2015

Related U.S. Application Data

(60) Provisional application No. 61/919,395, filed on Dec. 20, 2013.

(51) Int. Cl.
*G01B 11/275* (2006.01)

(52) U.S. Cl.
CPC .......... *G01B 11/275* (2013.01); *G01B 2210/12* (2013.01); *G01B 2210/24* (2013.01)

(58) Field of Classification Search
CPC ....... G01B 11/275; G01B 5/255; G01B 7/255
USPC ...................................... 33/203, 203.18, 600
See application file for complete search history.

(56) References Cited

U.S. PATENT DOCUMENTS

| | | | | |
|---|---|---|---|---|
| 4,097,157 A * | 6/1978 | Lill | .................... | G01B 11/2755 33/288 |
| 5,369,602 A * | 11/1994 | Naas | .................... | G01B 5/0025 33/203.18 |
| 5,488,471 A * | 1/1996 | McClenahan | ...... | G01B 11/2755 33/203.15 |
| 5,748,301 A * | 5/1998 | Muller | ................ | G01B 11/2755 33/286 |
| 2006/0185180 A1* | 8/2006 | MacKelvie | ............ | G01B 5/255 33/203.18 |
| 2008/0209744 A1* | 9/2008 | Stieff | ................. | G01B 11/2755 33/203.18 |
| 2009/0031782 A1* | 2/2009 | Jackson | ............. | G01B 11/2755 73/1.75 |
| 2010/0186244 A1* | 7/2010 | Schwindt | ................ | B60R 11/04 33/288 |
| 2013/0239420 A1* | 9/2013 | Kroll | ..................... | G01B 11/275 33/228 |
| 2014/0115906 A1* | 5/2014 | Pruitt | ..................... | G01B 5/255 33/203.18 |
| 2014/0310967 A1* | 10/2014 | Nagornov | .............. | G01B 21/26 33/301 |

\* cited by examiner

*Primary Examiner* — G. Bradley Bennett
(74) *Attorney, Agent, or Firm* — Polster, Lieder Woodruff & Lucchesi

(57) ABSTRACT

A method and apparatus for detecting, for wheel assemblies on opposite ends of an axle during an alignment angle measurement or inspection process, relative movement or slip between the alignment angle sensor or optical target and the wheel assembly upon which it is mounted. Changes in measurements of invariant characteristics of the solid axle or an associated wheel assembly are observed by an alignment measurement or inspection system as indications of movement or slip between at least one of the alignment angle sensors or optical targets and the associated wheel assembly. Upon detection of a change a measurement of an invariant characteristic, an operator is alerted by the alignment measurement or inspection system to the presence of movement or slip of one or both of the alignment angle sensors or optical targets associated with the wheel assemblies of the axle.

19 Claims, 4 Drawing Sheets

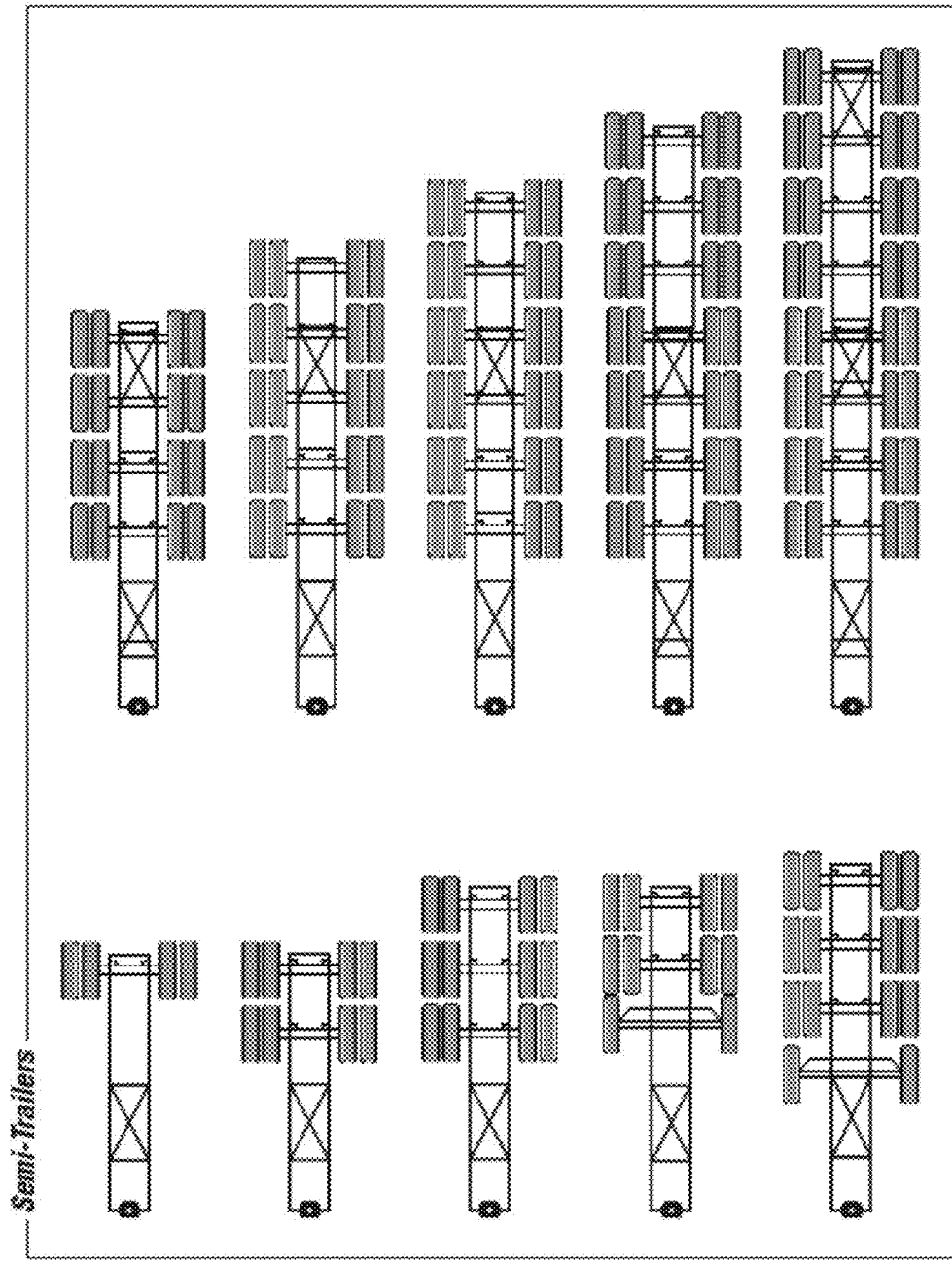
FIGURE 1 – PRIOR ART

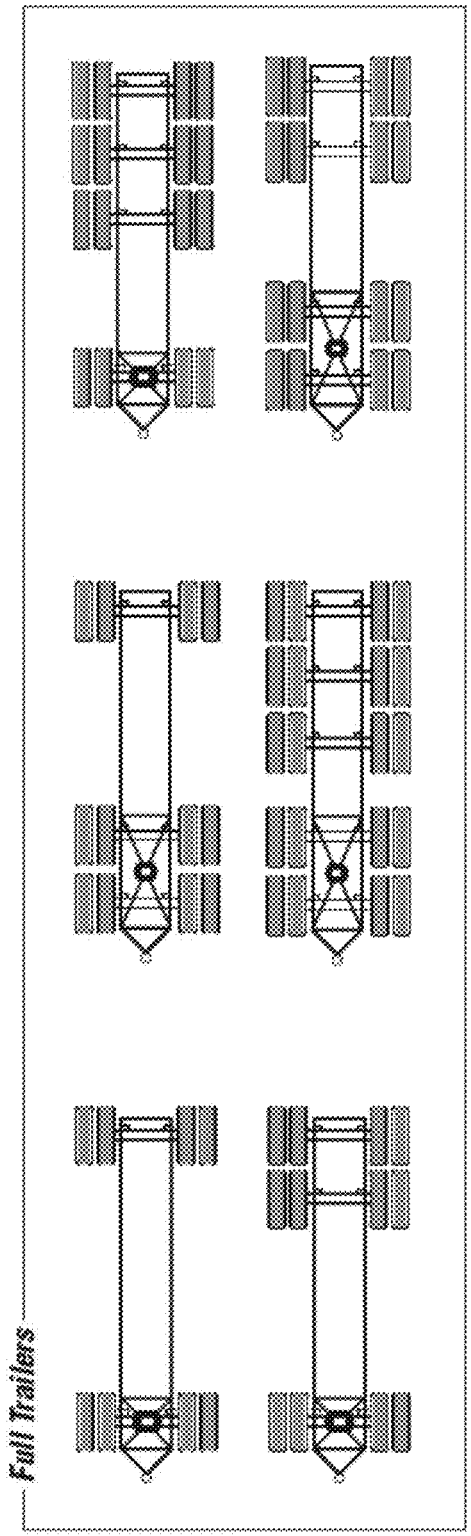
FIGURE 2 – PRIOR ART
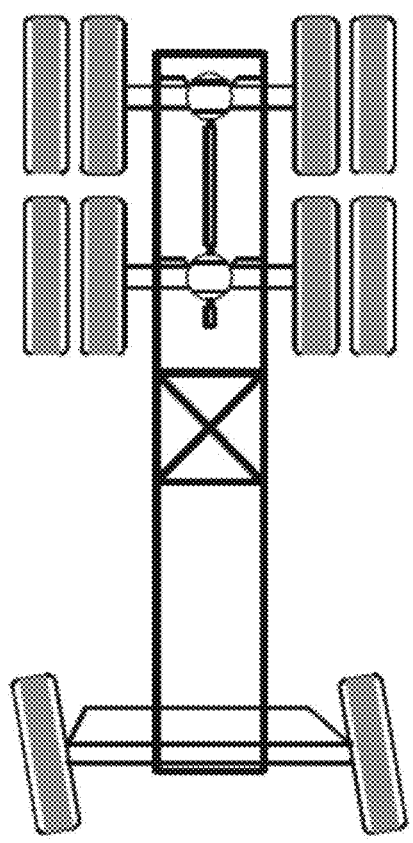
**FIGURE 3
PRIOR ART**

METHOD FOR DETECTING SENSOR OR TARGET SLIP DURING VEHICLE ALIGNMENT MEASUREMENT

CROSS-REFERENCE TO RELATED APPLICATIONS

The present application is related to, and claims priority from, U.S. Provisional Patent Application Ser. No. 61/919,395 filed on Dec. 20, 2013, and which is herein incorporated by reference.

STATEMENT REGARDING FEDERALLY SPONSORED RESEARCH

Not Applicable.

BACKGROUND OF THE INVENTION

The present application is related to the alignment of vehicles wheels located on an axle, such as passenger cars, trucks, trailers, or semi-trailers and in particular, to a method for detecting slip of an angle sensor or optical target mounted to vehicle wheels on an axle during the course of an alignment measurement process.

Many vehicle wheel alignment systems, such as those for heavy duty vehicles such as trucks, buses, and tractor trailers, rely upon angle sensors or optical targets which are secured to the individual wheels of the vehicle by mounting adapters during an alignment measurement procedure. There are a variety of methods for securing the mounting adapters to the vehicle wheels, most of which require some means for clamping, gripping, or temporarily engaging a surface of the wheel assembly tire, rim, lug nuts/bolts, or wheel hub component. Accurate measurements of vehicle wheel alignment angles necessitate that the angle sensors or optical targets which are coupled to the adapters remain in a fixed position relative to the wheel assembly on which they are secured during the measurement process.

When adjusting the alignment angles of vehicles, such as the trailers and semi-trailers shown in FIGS. 1 and 2, or a tow vehicle, such as shown in FIG. 3, each with one or more axles coupling wheels on opposite lateral sides, it is not uncommon for significant forces to be exerted directly (or indirectly) against the axles, axle brackets, or attachment means securing the axles to the vehicle frames. For example, the use of impact wrenches to loosen bolts, hammers to shift components, or pry bars exerting leverage against an axle or axle component, or even against other interconnected components on the vehicle, can all impart significant force to the vehicle axle, and can induce large vibrations therein. At other times during the alignment measurement or inspection procedures, the vehicle may be rolled short distances, which rotates the mounting adapters together with the associated vehicle wheels about their respective axis of rotation. The forces exerted on, and vibrations experienced by, an axle during adjustment and/or rolling movement can cause an improperly secured mounting adapter to slip or move relative to the vehicle wheel assembly to which it is secured. This movement may be sufficiently small to be unnoticed by a human operator, while still being statistically significant in terms of altering the alignment angles measured using the associated angle sensor or optical target. If the slip or movement remains undetected and/or uncorrected, the resulting alignment angle measurements for the vehicle will be inaccurate, and may lead to further incorrect adjustments to the vehicle while failing to correct a true misalignment.

Accordingly, there is a need for vehicle wheel alignment measurement systems, and in particular, for those systems adapted for use with vehicles having one or more axles, to provide a method by which mounting adapter slip or movement may be detected during the course of an alignment measurement and adjustment procedure.

BRIEF SUMMARY OF THE INVENTION

The present disclosure sets forth a method for detecting relative movement or slip between an angle sensor or optical target and the wheel assembly upon which it is mounted. During the alignment angle measurement or inspection process, the total toe angle for the wheel assemblies on opposite ends of the axle is observed to detect change. A change in the total toe angle indicates movement or slip has occurred in a plane parallel to the ground between at least one of the angle sensors or optical targets and the associated wheel assembly upon which it is mounted. To detect movement or slip in a plane perpendicular to the ground between at least one of the angle sensors or optical targets and the associated wheel assembly upon which it is mounted, the camber angle at each wheel assembly is observed to detect change. Upon detection a change in either of the toe or camber measurements, the operator is alerted to the presence of movement or slip of one or both of the angle sensors or optical targets associated with the wheel assemblies, and appropriate corrective action taken.

In a further embodiment, the present disclosure sets forth a method for detecting relative movement between an alignment angle sensor or optical target and a vehicle wheel assembly to which the sensor or target is mounted, by monitoring with the sensor or target, one or more invariant characteristics associated with the wheel assembly which may be mounted to any type of axle or suspension structure. Responsive to a detected change in the one or more measurements of an invariant characteristic of the wheel assembly, an indication of detected relative movement between the sensors or optical target and the associated vehicle wheel assembly is generated, enabling an operator to take appropriate corrective action.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a prior art illustration of exemplary semi-trailer solid axle configurations;

FIG. 2 is a prior art illustration of exemplary trailer solid axle configurations;

FIG. 3 is a prior art illustration of the solid rear axle configuration of a tractor vehicle such as might be used to tow the trailers found in FIGS. 1 and 2;

Corresponding reference numerals indicate corresponding parts throughout the several figures of the drawings. It is to be understood that the drawings are for illustrating the concepts set forth in the present disclosure and are not to scale.

Figure 4:
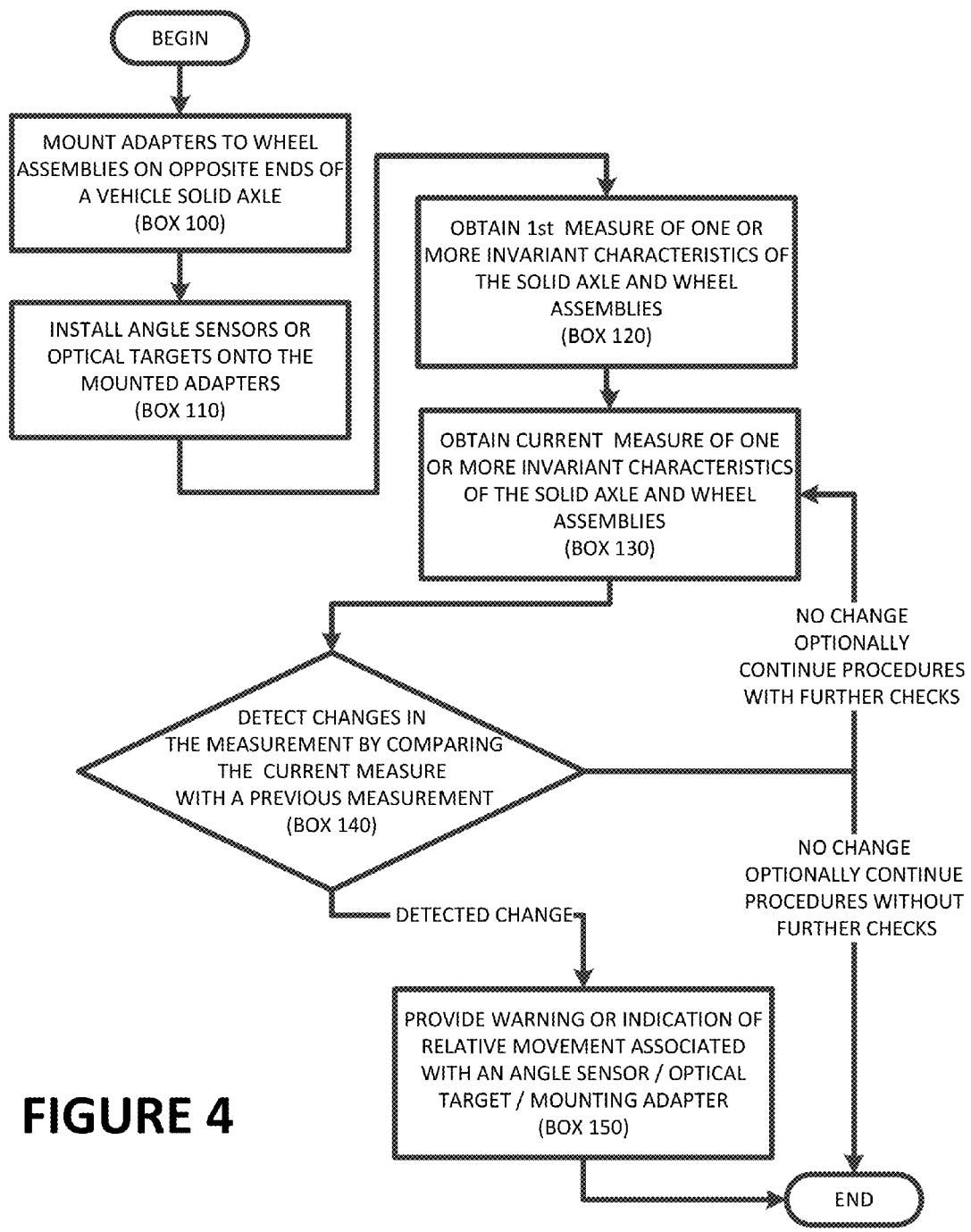
FIG. 4 is a flow chart illustrating the steps in a method of the present disclosure in the context of a vehicle with a solid axle.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 5:
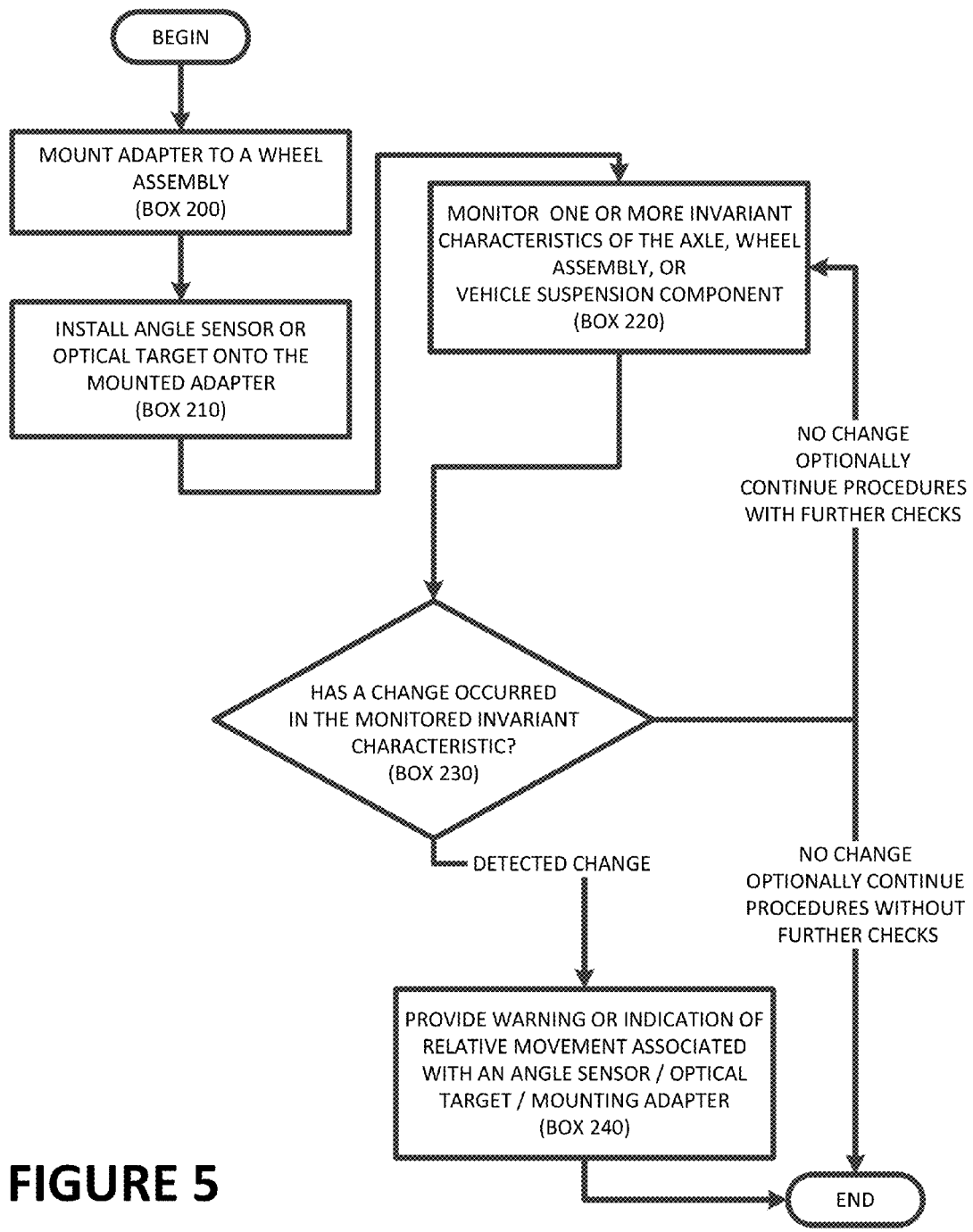
FIG. 5 is a flow chart illustrating an alternate method of the present disclosure in the context of any invariant characteristic associated with a vehicle wheel assembly.

Turning to the Figures, a method of the present disclosure is illustrated generally with reference FIGS. 4 and 5 for use by a vehicle wheel alignment measurement or inspection system during measurement or inspection of a vehicle. In one configuration, described in connection with FIG. 4, the vehicle includes at least one pair of wheel assemblies supported on opposite ends of a solid axle, while another configuration described in connection with FIG. 5, is suitable for use with any type of axle configuration. It will be understood that the term "solid axle" as used herein refers to vehicle wheel and axle assemblies in which the wheel assemblies at opposite lateral ends of the axle are each supported on a rigid structure along a common axis of rotation, such that positional changes in one wheel assembly impart corresponding changes in the other wheel assembly. A solid axle does not require that the wheel assemblies rotate synchronously about the common axis of rotation, such as if a limited-slip or open differential is interposed on the axis of rotation. Solid axle assemblies are contrasted with "independent suspension" axles, which are configured to permit positional changes in one wheel assembly relative to the other wheel assembly, such as through the interconnection of one or more U-joints in the axle assembly and the interaction of various suspension components.

When beginning a vehicle wheel alignment measurement or inspection procedure which utilize angle sensors or optical targets on the wheel assemblies of a solid axle, a set of adapters must first be secured in fixed relationship to the wheel assemblies on opposite ends of each solid axle from which measurements are to be acquired (Box 100). These mounting adapters may be secured to the vehicle wheel assemblies by any of a variety of methods, most of which require some means for clamping, gripping, or temporarily engaging a surface of the wheel assembly tire, rim, lug nuts/bolts, or wheel hub component. Once the adapters are mounted to the appropriate wheel assemblies, the angle sensors or optical targets are fitted to the adapters (Box 110), typically by engagement of a shaft and receiving bore arrangement. For some alignment measurement or inspection systems, the angle sensors or optical targets are integrated with the mounting adapters to form composite assemblies which are secured to the vehicle wheel assemblies as a unit.

During the alignment measurement or inspection procedure, data received from the angle sensors or acquired by processing images of the optical targets is analyzed by a vehicle service system processor configured with suitable software instructions, to obtain an initial measurement associated with an invariant feature or characteristic of the solid axle on the vehicle (Box 120). This invariant feature or characteristic may be any measurable property associated with the solid axle which does not change or is not altered by the alignment measurement or inspection procedure. Suitable invariant features or characteristics may include, but are not limited to, a measure of total toe for a single solid axle, or measures of camber for individual wheel assemblies disposed at each end of a single solid axle.

Subsequently, during the alignment measurement or inspection procedure, current measurements associated with the invariant feature or characteristic of each monitored solid axle of the vehicle are acquired (Box 130). The processor is configured with software instructions to compare the current measurements with previously acquired measurements (either the initial measurement acquired at the start of the procedure, or a measurement acquired earlier during the procedure) to detect any apparent changes in the measurements of the invariant feature or characteristic (Box 140). Since the feature or characteristic is known to be invariant during the alignment measurement or inspection procedure, such as due to the construction of the solid axle, it is presumed that any detected apparent change in the measurement of the invariant feature or characteristic is the result of movement or slip of an angle sensor or optical target relative to the wheel assembly on which it is mounted.

If no apparent changes in the measurement of the invariant feature or characteristic are detected by the processor, the alignment measurement or inspection process proceeds normally, with the measurement and comparison steps optionally repeated. In the event an apparent change in the measurement of the invariant feature or characteristic is detected, the processor is configured with software instructions to provide a warning or indication of the detected relative movement between an angle sensor or optical target and an associated vehicle wheel assembly upon which it is mounted (Box 150). The warning or indication may be in the form of a visual message or icon presented on a display associated with the vehicle service system, or in the form of an audible warning generated by a speaker associated with the vehicle service system. Depending upon the specific invariant feature or characteristic being measured and compared, the processor may have sufficient data from the measurements to identify the specific angle sensor or optical target at which the movement has occurred. For example, measurement of camber angles is associated with individual vehicle wheel assemblies, enabling individual identification while measurement of total toe is associated with the solid axle as a whole and cannot be isolated to an individual vehicle wheel assembly.

Once movement or slip of an angle sensor or optical target has been detected, the processor may be configured with software instructions to require restart of the measurement or inspection procedure, or alternatively, may be configured with software instructions to quantify the amount of movement or slip to establish corrective adjustment factors to be applied to ongoing measurements, thereby permitting the measurement or inspection procedure to continue. Optionally, the processor may be configured with software instructions to permit the measurement procedure or inspection to continue without interruption upon the detection of movement or slip, but noting that the condition occurred. Under these or other conditions of detected movement or slip, the processor may be configured to set an internal flag or indicator which warns that subsequently acquired alignment measurements or inspections results are of suspect quality due to the possibility of angle sensor or optical target movement or slip.

The method of the present disclosure, and apparatus for implementing it, is not limited for use in conjunction with angle sensors or optical targets mounted to wheel assemblies on only solid axles. Rather, as illustrated in FIG. 5, the method and apparatus of the present disclosure may be utilized to detect movement or slip of adapters (Box 200), angle sensors, or optical targets secured to wheel assemblies (Box 210) on independent suspension axle structures, or any other type of supporting assembly, through appropriate selection of an invariant feature or characteristic to be monitored (Box 220) to observe apparent changes (Box 230). An appropriate invariant feature or characteristic may be any measurable property associated with an axle, a wheel assembly, or independent suspension structure, and which does not change or is not altered during the alignment measurement or inspection procedure being carried out while the adapter, angle sensor, or optical target is being monitored for movement or slip. For example, during an alignment measurement or inspection procedure, the features or characteristics associated with the rear wheels of a vehicle may be considered to be invariant during an alignment adjustment for a front wheel. Hence, detection of any measurement change associated with a rear wheel of the vehicle during an adjustment to a front wheel can be identified as being in response to movement of an angle sensor or optical target on the rear wheel assembly, regardless of the specific axle or suspension associated with that wheel assembly. Once such an apparent (or actual) change is observed, a suitable warning can be provided to the operator (Box 240) for appropriate corrective action. An invariant feature or characteristic is not required to remain permanently fixed, but rather, is only required to remain invariant during the period in which it is being observed as a reference against adapter slip.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, microprocessor or logic circuit, the device becomes a specialized apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes a specialized apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for detecting relative movement between alignment angle sensors or optical targets and the vehicle wheel assemblies on opposite ends of an axle on which the respective alignment angle sensors or optical targets are mounted, comprising:
    monitoring with the alignment angle sensors or optical targets, at least one measurement of an invariant characteristic associated with the axle and wheel assemblies;
    responsive to a detected change in said at least one measurement, generating an indication of detected relative movement between at least one of said alignment angle sensors or optical targets and said associated vehicle wheel assemblies.

2. The method of claim 1 wherein said step of monitoring occurs during an alignment measurement procedure.

3. The method of claim 2 wherein said alignment measurement procedure is associated with a component of a vehicle other than said axle and said associated vehicle wheel assemblies.

4. The method of claim 1 wherein said axle is a solid axle, and wherein said at least one invariant characteristic associated with said solid axle and vehicle wheel assemblies remain fixed by the structure of the solid axle and vehicle wheel assemblies.

5. The method of claim 1 wherein said at least one invariant characteristic include a measure of wheel camber for each vehicle wheel assembly.

6. The method of claim 1 wherein said at least one invariant characteristic include a measure of total toe for the axle.

7. The method of claim 1 wherein said indication is a warning to an operator.

8. The method of claim 1 wherein said indication is a signal to a software program executing on a processor within a vehicle wheel alignment or inspection system.

9. A vehicle inspection system, comprising:
    a set of sensors configured to acquire measurements associated with wheel assemblies on opposite ends of an axle, said sensors having at least one component maintained in a positional relationship relative to each associated wheel assembly;
    a processor configured with software instructions to receive measurement data from said set of sensors, and to process said measurement data to measure at least one invariant characteristic associated with said axle; and
    wherein said processor is further configured with software instructions to identify a change in said measure of said at least one invariant characteristic during an alignment measurement or inspection procedure, said change indicative of relative movement between at least one of said sensor components and said associated wheel assembly.

10. The vehicle inspection system of claim 9 wherein said at least one invariant characteristic includes wheel camber for at least one of said wheel assemblies.

11. The vehicle inspection system of claim 9 wherein said at least one invariant characteristic includes total toe for said wheel assemblies on said axle.

12. The vehicle inspection system of claim 9 wherein said processor is further configured with software instructions to generate a warning of sensor movement to an operator in response to said identification of said change in said measurement.

13. The vehicle inspection system of claim 9 wherein said axle is a solid axle.

14. The vehicle inspection system of claim 9 wherein said alignment measurement or inspection procedure is associated with a vehicle component other than said axle and said associated wheel assemblies on said axle.

15. A method for detecting relative movement between a vehicle wheel assembly and an alignment angle sensor or optical target mounted there on, comprising:
    monitoring with the angle alignment sensor or optical target, one or more measurements of an invariant characteristics associated with at least one of the wheel assembly, an axle associated with the wheel assembly, or a vehicle component associated with the wheel assembly; and responsive to a detected change in said one or more measurements of the invariant characteristic, generating an indication of detected relative movement between either of said alignment angle sensor or said optical target, and said associated vehicle wheel assembly.

16. The method of claim 15 further including conducting an alignment adjustment procedure for a vehicle associated with the vehicle wheel assembly while monitoring said one or more measurements of said invariant characteristic.

17. The method of claim 15 wherein said invariant characteristic is one of camber, toe, or total toe.

18. The method of claim 15 wherein said invariant characteristic is temporarily invariant during said step of monitoring.

19. The method of claim 15 wherein said axle associated with the wheel assembly is a solid axle.

* * * * *